Patented Oct. 17, 1922.

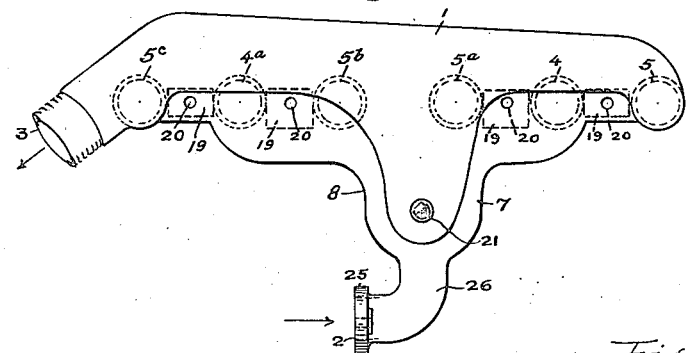
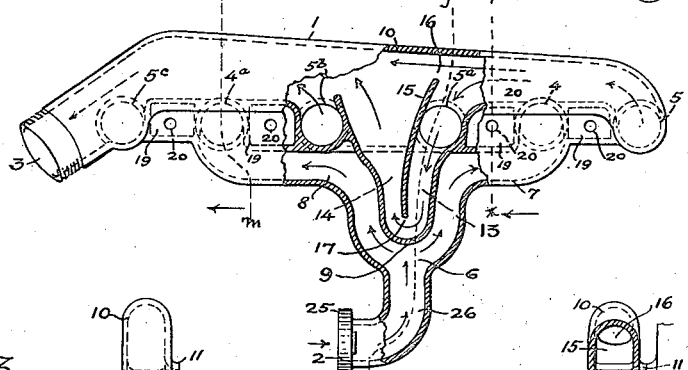
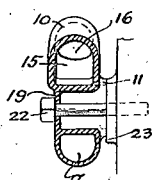
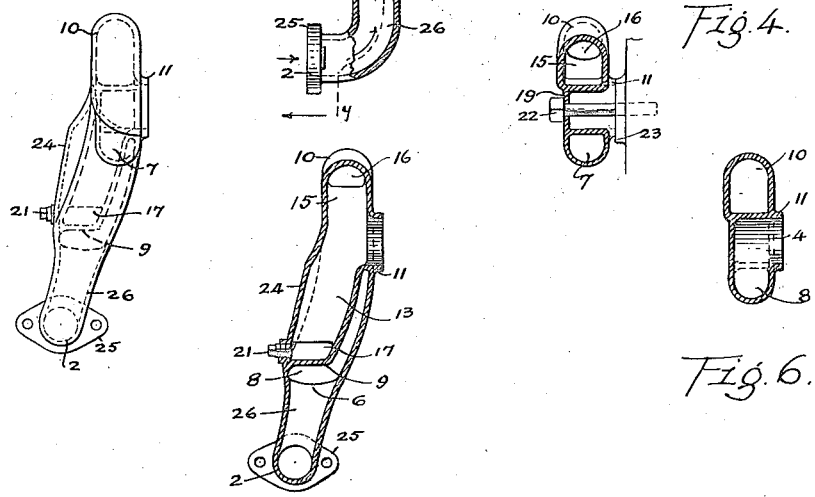
R. C. HOFFMAN.
COMBINED INTAKE AND EXHAUST MANIFOLD.
APPLICATION FILED NOV. 2, 1917.
1,432,394.
Patented Oct. 17, 1922.
2 SHEETS—SHEET 1.
Roscoe C. Hoffman, Inventor

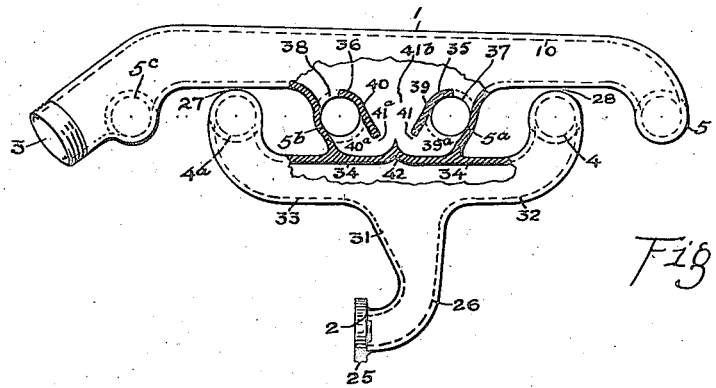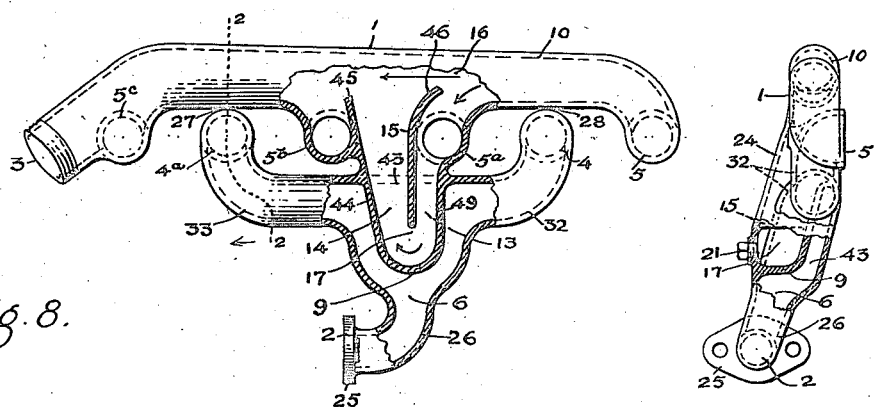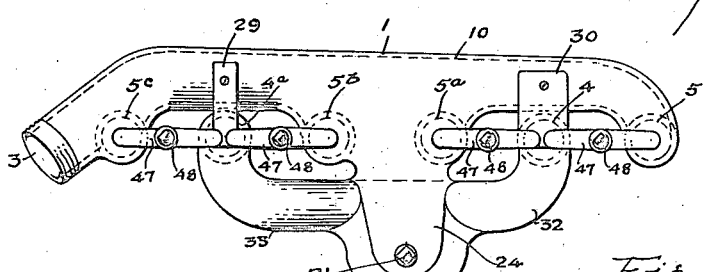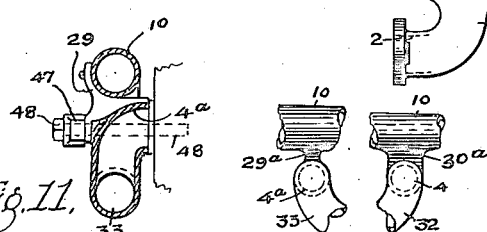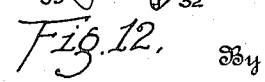

1,432,394

UNITED STATES PATENT OFFICE.

ROSCOE C. HOFFMAN, OF ARGOS, INDIANA, ASSIGNOR, BY MESNE ASSIGNMENTS, TO THE ANDERSON COMPANY, OF SOUTH BEND, INDIANA, A CORPORATION OF INDIANA.

COMBINED INTAKE AND EXHAUST MANIFOLD.

Application filed November 2, 1917. Serial No. 199,887.

*To all whom it may concern:*

Be it known that ROSCOE C. HOFFMAN, citizen of the United States, residing at Argos, in the county of Marshall and State of Indiana, has invented certain new and useful Improvements in Combined Intake and Exhaust Manifolds, of which the following is a specification.

My invention relates to improvements in combined intake and exhaust manifolds and it more especially comprises the special features pointed out in the annexed claims.

The purpose of my invention is to provide a one-piece manifold that will serve both the intake and exhaust of internal combustion engines; that utilizes the heat of the exhaust to raise the temperature of the incoming fuel charges; that specially deflects a portion of the exhaust to a recurving passage located adjacent the intake so as to concentrate the heat of such deflected exhaust within a hot area to instantly volatilize the heavier particles of the incoming fuel; that gives marked economy with gasoline or kerosene fuels; that efficiently vaporizes kerosene; that equalizes the heat of the exhaust so that each intake port is subjected to practically the same degree of heat; that prevents undue reduction of and stabilizes volumetric efficiency in the engine; that secures and maintains an equalized distribution of a thoroughly volatilized gas to all the cylinders of the engine; that is quickly placed in position on an engine instead of the usual separate manifolds; that is simple in construction; and that can be economically manufactured.

With these and other ends in view I illustrate in the accompanying drawing such instances of adaptation as will disclose the broad underlying features without limiting myself to the specific details except as determined by the appended claims.

Fig. 1 is an outside elevation of a combined manifold as applied to an engine.

Fig. 2 is a similar elevation to Fig. 1 but in section with the outer portion removed to show the various passages, parts, etc.

Fig. 3 is a right hand elevation of Figs. 1 and 2.

Fig. 4 is an elevation in section on line $x$—$x$ of Fig. 2.

Fig. 5 is an elevation in section on line $y$—$y$ of Fig. 2.

Fig. 6 is an elevation in section on line $m$—$m$ of Fig. 2.

Fig. 7 is an elevation partly in section of a preferred form of manifold when gasoline is used.

Fig. 8 is a similar view to Fig. 7 of a preferred form of manifold applicable to kerosene fuel.

Fig. 9 is an end elevation partly in section of Fig. 8.

Fig. 10 is an elevation of a manifold with equalizing plates attached.

Fig. 11 is an elevation in section on line 2—2 of Fig. 8.

Fig. 12 is a fragmentary elevation of "cast in" junction points instead of the plates shown in Fig. 10.

Manifolds of this type are only applicable to engines which have the intake and exhaust on the same side of the cylinders, more especially exemplified by the well known type of Ford cars. It should however be understood that the specific constructional details relating to the proportions of the parts and their location with respect to each other may be varied within wide ranges to adapt the devices to the exigencies of practice as found in other cars of this same general type. The one point which is essential is the provision of a hot-area, heated by the exhaust, that is placed adjacent the path of the incoming fuel.

One-piece manifolds have been made without providing a properly located hot-area and the results have not approached an ideal efficiency because the intake ports and passages leading thereto have not been uniformly heated; the forward intake being heated by the exhaust from a single cylinder only, while the rear inlet must of necessity receive the heat of three exhausts.

With one exemplification (Figs. 1 to 6) of my improved construction a portion of the exhaust from the two forward cylinders is deflected into a descending and ascending channel located between the two intake branches, thus heating both branches as the heated products of combustion pass downward and upward in their travel to the main exhaust pipe. The rear inlet receives the benefit of the deflected heat and in addition receives some heat from the exhaust of one of the two rear cylinders. When the descending hot gases are suddenly turned back so as to rise alongside of the descending flow an intense heat is developed at this place which is concentrated into a very small space forming a hot-area of very high efficiency against which the incoming gases are projected through the suction of the engine. This additional vaporization supplements that which is ordinarily found to take place in the carburetor itself. The latter takes care of the more readily volatilizable fuel particles while the latter completely vaporizes any remaining heavier particles which if not turned into a gas would tend to lower the entire car efficiency.

With my improved manifold remarkable increases in mileage are secured per gallon of liquid fuel—gasoline. If proper provision is made for priming the cylinders on starting with a cold engine the manifold will serve the engine efficiently when kerosene is substituted for gasoline.

In carrying my invention into practice I may use a construction as exemplified in the accompanying drawings or any practical equivalents thereof. In the instance shown in Figs. 1-6 the manifold 1 is provided with a main intake 2 from the engine carburettor not shown. The carburettor is attached by means of a flange 25 in a well known manner, and the manifold is provided with a main or common outlet 3 leading to the usual exhaust pipe. From the inlet 2 the fuel duct is bent vertical into pipe 26. At 6 the single passage within pipe 26 divides into two passages, 7 being a short one and 8 a long one. These passages in the first part of their course pass upward for a short distance to enclose between them a tortuous exhaust passage 13, 14, they then turn horizontally beneath the exhaust ports 5ª, 5ᵇ of the two middle cylinders and then by a short upward turn lead into their respective inlet ports 4 and 4ª.

The exhaust ports connect with the main exhaust channel 10 which leads to the outlet 3. At 16 this channel is restricted by partition 15 so that a part of the burnt gases of the two forward cylinders at 16 divide and pass in front of the wall 15 downward into channel 13 to the opening 17 formed about opposite the junction point 6 of the incoming fuel. Between these the partition at 9 becomes intensely hot because the direction of travel is suddenly changed and the exposed area is a small one. From here the deflected portion of the exhaust passes upward in channel 14 alongside branch 8 of the intake where a further extraction of its heat takes place causing an efficient vaporization of the fuel. The descending stream in channel 13 passing alongside the passage way 7 also gives up a part of its heat to this part of the fuel intake. (See Fig. 2).

The integrally formed combined manifold of Figs. 1-6 is provided with the usual bosses 11 that coact with bosses 23 formed on the engine cylinders. Bolts 22 or other fastenings serve to hold the manifold in position. These pass through holes 20 made in the webs 19. If desired the branch exhaust channels 13 and 14 may be enlarged as shown at 24 in Fig. 5. A cleaning out plug 21 may be provided, the "opening" for it serving also to facilitate the manipulation of the cores in casting.

It should be further pointed out that with constructions embodying the broad features of the exemplifications shown a large heat radiating surface is provided in contact with the intake gas which causes a continuous application of heat as the flow of gases rises until the process of vaporization is complete.

The localization of the heat at 9 results in a blow torch effect that causes instant vaporization and a marked decrease of carbonization. Practical tests have shown that this manifold does not "load," (condense gas on the walls of the intake passages), hence these gases are not chilled, thus a much higher working efficiency is attained than has heretofore been possible. A further simile may be used. The projection of the heavier particles of intake fuel against the hot-area may be likened to the dropping of water on a very hot surface which by impact and concentration of heat causes instant vaporization. Similarly the fuel engages the hot-area and is turned into a gas with the shortest possible time constant.

In any preferred form of construction exemplified in Figs. 7-11 inclusive I retain the integral feature of the manifold shown in Figs. 1-6 throughout, except at the ends where a clearance is left at 27 between exhaust channel 10 and inlet 4ª. A similar clearance is left at 28 between exhaust channel 10 and inlet 4. This type of construction avoids difficulties of registration due to casting conditions between all the openings of the combined manifold and engine points. Ordinarily any lack of registration at the exhaust ports is not as vital as at the inlet ports. If leakage occurs at the latter joints the working efficiency of the engine will be seriously affected because the quality of the intake gases will be lowered.

A separation at these points admits of a further heat control through the use of a narrow contact plate 29 at 27 and a broad one 30 at 28, so that the increased volume of heat in channel 10 opposite 27 is transferred to inlet port 4ª to correspond or balance with the smaller volume of heat opposite 28 which at this point is transferred to intake port 4 over a larger contact plate 30. In this way a modified equalization is brought about. By having the parts separated at 27 and 28 the disadvantage of the construction shown in Figs. 1 and 2 is avoided. In the latter, intake port 4ª is subjected to about three times the heat that passes intake port 4 thus heating the fuel charge for port 4ª successively to the disturbance of the overall volumetric efficiency. However if desired these parts may be cast together as shown in Fig. 12.

In integrally formed combined manifolds as instanced in Figs. 1 to 6 inclusive or in substantial equivalents thereof wherein the two passages are in continuous coextensive parallel relation with a division wall therebetween, marked disadvantages arise due to an unbalanced relation which is clearly disclosed by comparing Figs. 7 to 11 inclusive, with Figs. 1–6. This unbalancing is due to the fact that, referring to Fig. 2, the dividing wall between intake port 4 and exhaust channel 10 is subjected only to the heat of passing gases from exhaust port 5 while the dividing wall at intake port 4ª is passed by the hot gases from exhaust ports 5, 5ª and 5ᵇ, the gases from exhaust port 5ᶜ being wasted. This unbalanced condition as to the heating of the dividing wall extends also to such constructions as provide a continuous partition between the exhaust and intake pipes. This is undesirable because it results in the delivery of intake gases of differing quality to the different cylinders. Assuming that the gas proportions are correct for intake port 4 then under an arrangement of parts as shown in Figs. 1 to 6 inclusive or their practical equivalent, the gas at the same time being delivered into intake 4ª will be overheated to a point which will materially reduce volumetric efficiency, while if the relation is proper for port 4ª it will be unbalanced for port 4 because of inadequate vaporization.

In the construction shown in Fig. 8 a balanced relation throughout is maintained for the further reason that the total volume of exhaust gas which is diverted by the curved end 46 of partition 15 into channel 13, descending against wall 49 and ascending through channel 14 against wall 44 equally heat the respective branches 32 and 33 of the main intake 26. This traverse is sufficient to completely vaporize any remaining heavy particles that have not been taken care of by the carburetter. Once the vaporization is complete any further application of heat becomes a disadvantage. The character of the fuel whether gasoline, kerosene, etc., determines the amount of heat that should be applied to the intake charges and the length of time the heat should be applied.

A preferred construction specially adapted to the use of gasoline is instanced in Fig. 7. In this exemplification short channels 39ª and 40ª in a measure take the place of the longer channels 13 and 14 shown in Figs. 2 and 8. The main intake 26 from the carburetter is enlarged laterally into a chamber. Its upper wall 34 becomes highly heated and the inrushing gases coming through the passage 26 and the enlargement 31 including any heavier unvaporized particles, strike this wall and by reason of their rapid impact against the intensely heated area adjacent the curved face 42 are broken up into a homogeneous gas for delivery to the engine through intake ports 4 and 4ª.

Exhaust ports 5ª and 5ᵇ deliver the greater part of their gases respectively through openings 41 and 41ª from short passage ways 39ª and 40ª into chamber 41ᵇ from which they pass into channel 10 to mingle with exhaust gases coming from the port 5 and any small amounts that may come through the restricted opening 37 from port 5ª. One side of the short channels 39ª and 40ª defined by walls or baffles 39 and 40 which have curved upper ends 35 and 36 that serve to contract openings 37 and 38 so that more of the exhaust gases from ports 5ª and 5ᵇ will be directed against wall 34 adjacent curved face 42 instead of passing directly into exhaust channel 10. This concentrates the heat from two exhausts onto wall 34 on the opposite side of which fuel charges are obliged to pass. Thus a most efficient vaporization is effected through which great economies are secured.

Figure 8 shows a preferred form of construction more especially adapted to heavier fuels such as kerosene, where volatility is low and vaporization consequently more difficult. To secure adequate vaporization under these conditions it is necessary to provide a more elaborate construction than is required for more easily vaporized fuels like gasoline, etc.

The passages 13 and 14 of Fig. 8 have a passage 43 to the rear thereof, as shown in Figs. 8 and 9 communicating with passages 32, 33 and 6. The passage 14 is formed between partition 15 and wall 44 whose upper end 45 projects above the exhaust port 5ᵇ. The manifolds instanced in Figs. 7–11 are secured on the engine in the ordinary way by means of the usual crabs 47 and bolts 48.

In manifolds which have the exhaust and intake pipes of substantially the same length placed side by side in one integral piece dependence is placed only on the passing of the fuel charges alongside a heated wall, without making provision for a concentration of heat near the main inlet from the carburetter. In the present invention the exhaust gases produce a "blow torch" effect on one side of a dividing wall at 9 and 34 to instantly vaporize any unvaporized particles which strike the wall on the other side. Such a provision insures a quicker response to the first heat streams that pass along from the exhaust of a cold engine, thus shortening the period of inefficiency in starting when low engine and manifold temperatures retard the carburetion of fuel and invite condensation, etc.

The fuel coming from the carburetor, by virtue of the heated surfaces 9 or 42 becomes concentrated at these points, thus rapidly transferring its heat to all parts of the intake and insuring a complete and speedy volatilization ready to be acted on by the ignition spark. This very advantageous condition is attained by reason of the maximum deflection of a part of the exhaust gases by the walls 15, 39 and 40 which turn a part of the heat stream flowing back into passages 13, 39ª and 40ª in effect, practically reversing its direction, thus concentrating heat at the point of maximum density of fuel gas at 9 and 42, by reason of the maximum deflection—reversal of flow of a portion of the exhaust gas.

This invention is of commanding importance and any and all means which secure a balanced temperature distribution so that all intakes are heated to practically the same extent, come within its scope.

What I claim is,

1. In internal combustion engines, an integrally formed intake and exhaust manifold for multicylinder engines, comprising a pair of inlet openings, a passage common to both leading from the carburetor, a hollow wall depending into such passage, an exhaust member integrally connected to such wall and extending to the right and left of both inlet openings terminating in close connection to said openings, exhaust openings leading into the exhaust member, and deflecting means within the hollow wall adapted to direct exhaust gases into close proximity to the incoming fuel charges.

2. In internal combustion engines, an integrally formed intake and exhaust manifold for multicylinder engines, comprising inlet openings to the engine, a passage common to such openings leading thereto from the carburetor, a hollow wall depending into such passage, an exhaust member integrally connected to such wall and extending past the inlet openings and terminating near the same, exhaust openings from the engine leading into the exhaust member, and deflecting means within the hollow wall adapted to direct exhaust gases into close proximity to the incoming fuel charges.

In testimony whereof I affix my signature in the presence of two witnesses.

ROSCOE C. HOFFMAN.

Witnesses:
F. J. YENN,
T. H. HUBER.